(12) United States Patent
Hamilton

(10) Patent No.: US 10,299,424 B2
(45) Date of Patent: May 28, 2019

(54) ADJUSTABLE DAMPENING FOR PLANTER ROW UNIT

(71) Applicant: AGCO Corporation, Duluth, GA (US)

(72) Inventor: Kevin J Hamilton, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 58 days.

(21) Appl. No.: 15/627,575

(22) Filed: Jun. 20, 2017

(65) Prior Publication Data

US 2018/0153091 A1     Jun. 7, 2018

Related U.S. Application Data

(60) Provisional application No. 62/353,590, filed on Jun. 23, 2016.

(51) Int. Cl.
| | |
|---|---|
| *A01C 5/06* | (2006.01) |
| *B60G 17/08* | (2006.01) |
| *B60G 17/015* | (2006.01) |
| *B60G 17/019* | (2006.01) |
| *B60G 17/016* | (2006.01) |
| *A01C 7/20* | (2006.01) |
| *A01C 7/08* | (2006.01) |

(52) U.S. Cl.
CPC .............. *A01C 5/064* (2013.01); *A01C 7/205* (2013.01); *B60G 17/0152* (2013.01); *B60G 17/0164* (2013.01); *B60G 17/01908* (2013.01); *B60G 17/08* (2013.01); *A01C 7/08* (2013.01); *B60G 2202/24* (2013.01); *B60G 2202/25* (2013.01); *B60G 2300/08* (2013.01); *B60G 2400/106* (2013.01); *B60G 2800/01* (2013.01)

(58) Field of Classification Search
CPC .... A01C 5/064; A01C 7/205; B60G 17/0152; B60G 17/0164; B60G 17/01908; B60G 17/08
See application file for complete search history.

(56) References Cited

U.S. PATENT DOCUMENTS

2014/0116735 A1*  5/2014  Bassett ............... A01B 61/044
                                                           172/2
2015/0264857 A1      9/2015  Achen et al.

OTHER PUBLICATIONS

UK Intellectual Property Office, International Search Report for related UK Application No. GB1612630.2, dated Jan. 24, 2017.

* cited by examiner

*Primary Examiner* — Michael D Lang

(57) ABSTRACT

A row unit has a frame with an upper portion and a lower portion. The upper portion has a parallel linkage and the lower portion is coupled to plural gauge wheels. A first sensor is configured to provide an output signal and a controllable device is coupled to the upper portion and configured to provide an adjustable down force. A dampening device is coupled to the upper portion and configured to provide adjustable dampening of the row unit based on the output signal.

15 Claims, 4 Drawing Sheets

ADJUSTABLE DAMPENING FOR PLANTER ROW UNIT

CROSS REFERENCE TO RELATED APPLICATION

This application claims the benefit of U.S. Provisional Application No. 62/353,590 filed Jun. 23, 2016, which is hereby incorporated by reference in its entirety.

BACKGROUND

Technical Field

The present disclosure is generally related to agricultural equipment, and more particularly, agricultural equipment for seeding.

Description of Related Art

Row crop planters are used to seed fields. Field terrains differ in their topology and/or surface conditions. Some surface conditions, such as rough surfaces, may impact seed release from a row unit seed reservoir and/or seed placement in furrows created by the row units. For instance, rapid accelerations (e.g., jerky movements, or generally, rapid changes in direction) of the row units occurring as a result of being towed across rough terrain may cause seed placement to be placed at varying depths, resulting in lower yield. Several different solutions exist for planter down force control, including several that are closed-loop controlled for changing conditions. These systems limit row unit movement by using down pressure only. At least one agricultural equipment manufacturer provides a passive dampening system on their row units to help mitigate the affects of rough terrain.

SUMMARY OF THE INVENTION

A row unit has a frame with an upper portion and a lower portion. The upper portion has a parallel linkage and the lower portion is coupled to plural gauge wheels. A first sensor is configured to provide an output signal and a controllable device is coupled to the upper portion and configured to provide an adjustable down force. A dampening device is coupled to the upper portion and configured to provide adjustable dampening of the row unit based on the output signal.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Figure 1:
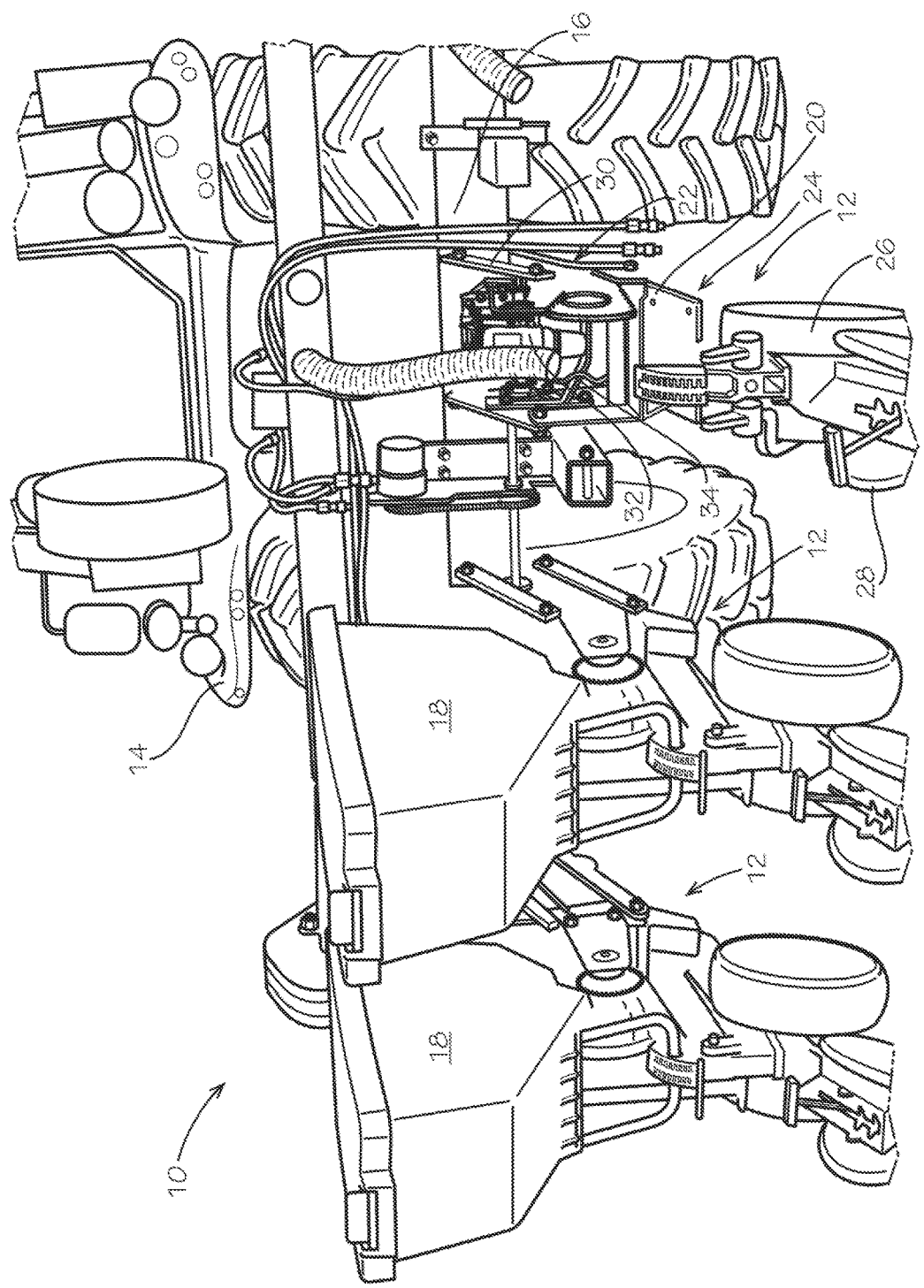
FIG. 1 is a schematic diagram that illustrates, in rear perspective view, a planter comprising a plurality of row units for which certain embodiments of a planter adjustable dampening system may be used.

Certain embodiments of a planter adjustable dampening system and method are disclosed that use different controls for down force and dampening of row units of a planter. In one embodiment, a performance threshold is based on acceptable seed placement based on movement of a row unit. The movement may be measured based on sensor data, such as accelerometer data or position data of a cylinder or other moveable mechanisms used for down force control. The planter adjustable dampening system monitors the accelerations of the row unit, and when the accelerations meet or exceed a predetermined threshold, a dampening action is implemented that is separate from the down force controls, the dampening action used to control the shock of abrupt row unit movement (accelerations, including lurch or jerking motions) that may occur while traversing a field.

Digressing briefly, conventional planter systems use either down force control or passive dampening, but not both types of controls. By using separate control of down force and dampening, one benefit may be a reduction in the change in seed trajectory inside a traditional seed tube and/or more consistent release of seed from a seed tube to the trench (furrow).

Having summarized certain features of a planter adjustable dampening system of the present disclosure, reference will now be made in detail to the description of the planter adjustable dampening system as illustrated in the drawings. While the planter adjustable dampening system is described in connection with these drawings, there is no intent to limit the system to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

It is noted that reference herein to left and right and front and rear is from the perspective of an operator navigating a tractor or other towing vehicle that tows a planter in a forward direction. Also, reference to down force refers to the force that is applied to a row unit by an actuable device, such as an air bag, hydraulic or pneumatic actuator, etc. Reference to down force margin includes an amount of additional down force applied to a row unit that is beyond that required to achieve penetration (e.g., by furrow openers) to a desired planting depth, the additional weight carried by gauge wheels. The soil provides a resistance to the penetration. Thus, the sum of the weight of the row unit and the down force, with the soil resistance subtracted from the sum, equates to a down force margin (e.g., target down force margin). Dampening refers to a reduction in rate of change in direction of row unit movement, effectively reducing peak acceleration frequency and/or amplitude experienced by conventional row units operating over rough field surfaces. Stated otherwise, in certain situations, the effects of acceleration are a limiting factor to controlled seed placement, as opposed to downforce control or downforce margins. It should be appreciated by one having ordinary skill in the art, in the context of the present disclosure, that smoothing out the ride through dampening control is balanced with a reduction in down force margins.

Figure 2:
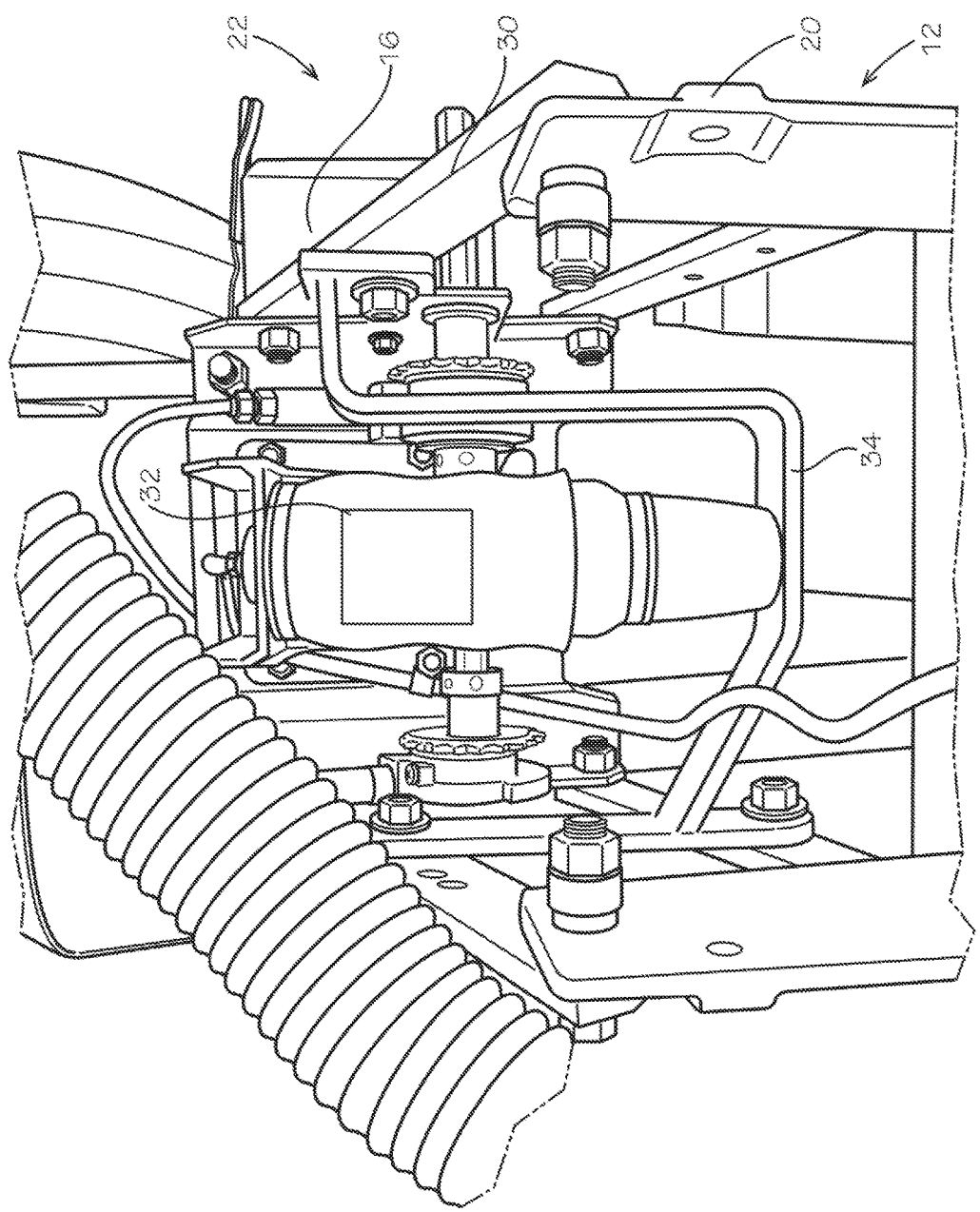
FIG. 2 is a schematic diagram that illustrates, in rear elevation view, an air bag comprising an integrated magnetorheological fluid dampener coupled to an upper portion of each of the row units of FIG. 1.

FIG. 1 is a schematic diagram that illustrates a planter 10 comprising a plurality of row units 12 being towed by a towing vehicle 14 (e.g., tractor), the planter 10 comprising an embodiment of a planter adjustable dampening system. For instance, a suitable row unit 12 may be embodied as a White Planters 8000 or 9000 Series row unit by AGCO, though others styles of row units and/or row units provided by other manufacturers may be suitable hosts for certain embodiments of a planter adjustable dampening system, and hence are contemplated to be within the scope of the disclosure. The row units 12 of the planter 10 are coupled to a transverse draw bar 16 that is part of a frame or frames that couples to the towing vehicle 14. Though the planter 10 in FIG. 1 is depicted with two reservoirs 18, one each for the left-two row units 12 in FIG. 1, it should be appreciated by one having ordinary skill in the art that each row unit 12 will typically be equipped with a reservoir 18 that holds seed to be extracted and disbursed into the field, and that the quantity of row units 12 may be different for certain implementations (e.g., in some implementations, up to forty-eight (48) row units). Referring to the row unit 12 at the right in FIG. 1 that has the reservoir 18 removed, which more fully shows the row unit features, the row unit 12 comprises a frame 20 having an upper portion 22 and a lower portion 24 comprising an equalizer arm. Also shown coupled to the lower portion 24 are gauge wheels 26 and closing wheels 28. Also coupled to the lower portion are furrow openers (obscured from view). The gauge wheels 26 are positioned slightly behind and immediately adjacent the respective furrow openers. As the gauge wheels 26, furrow openers, and closing wheels 28 are of a known function and structure, the description of the same is omitted here to avoid obfuscating the features of a planter adjustable dampening system. The upper portion 22 comprises a parallel linkage 30, which is a linkage commonly used among row units in general. The parallel linkage 30 permits up and down movement of the row unit 12 relative to the draw bar 16. Also shown coupled to the upper portion 22 and the draw bar 16 is a control and dampening device 32, shown in close-up in FIG. 2. The control and dampening device 32 comprises two devices integrated into a single package, including a controllable device for adjustable control of the down force for the row unit 12, and a dampening device for adjustable control of the dampening rate of the row unit 12. The controllable device comprises an air bag (also known as air spring), though other types of actuable devices may be used, including hydraulic actuators, springs, etc. The dampening device comprises a magnetorheological (MR) fluid dampener, though in some embodiments, other types of dampening devices may be used, including those that vary the dampening rates by changing the viscosity of their fluid or vary the orifice characteristics. In some embodiments, the controllable device and the dampening device may be separately packaged units arranged proximal to each other and both coupled between the upper portion 22/draw bar 16 and a lower frame member 34 of the parallel linkage 30. Hereinafter, the focus of the description for the control and dampening device 32 is based on the embodiment using an integrated package except where noted below, with the understanding that the description that follows is similarly applicable to the separately packaged embodiment. With continued reference to FIGS. 1-2, the controllable device is adjustable (e.g., via an air valve or solenoid that is operably connected to a controller), enabling an increase or decrease in down force. For instance, an air source, such as a compressor, provides a supply of air to the controllable device via the air valve, the air valve opening and closing to control the flow of air to the controllable device. The controllable device acts between the draw bar 16 and the parallel linkage 30 to apply a down force on the row unit 12. The down force applied by the controllable device provides a sufficient amount of force to enable insertion of furrow openers (e.g., double disc furrow or trench openers, obscured from view in FIG. 1) into the soil to form a furrow or trench of desired depth. Though the description above discloses the use of air, other fluids may be used. The dampening device, as indicated above, comprises an (MR) fluid dampener, though in some embodiments, dampening devices that employ electrophoretic fluids (EP), electrorheological fluids (ER), or hydraulic fluids (e.g., semi-active electromechanical) may be used. In the description that follows, a short description of an example dampening device that operates according to magnetorheological fluid control is described with the understanding that other mechanisms (e.g., ER, EP, adjustable hydraulic, etc.) known in the art may be used for the dampening function.

The MR fluid dampener (also known as an MR fluid damper), as is known, comprises in one design version a cylindrical hollow body which is partially closed at one end and fully closed at the other end. A slender rigid piston rod is slidably and sealingly received in an aperture formed within a bushing and sealed by a seal, both of which are supported within end caps at each end. The MR fluid dampener includes an accumulator comprised of a partition, such as a diaphragm, and a gas chamber. The accumulator functions to accommodate the fluid displaced when the piston rod enters into an internal chamber. A fill valve is used to appropriately pressurize the chamber. Other types of accumulators may be used, as are known to those of ordinary skill in the art. The piston assembly separates the internal chamber into first and second fluid chambers. The piston assembly preferably includes an axially extending annular passage through which the controllable fluid, such as an MR fluid may flow. The piston assembly comprises a wear band or wear bands manufactured from an appropriate friction reducing material and of the appropriate diameter to cause the piston assembly to act as a plunger to force MR fluid between the chambers as a consequence of row unit (acceleration) movement. A magnetic field is generated by supplying a control signal to leads of the MR fluid dampener, which electrically interconnect to a circumferentially wound coil supported within the piston assembly. The magnetic field is directed by pole to act across the MR fluid contained within the annular passage, which causes a rheology change (a thickening or apparent viscosity change) which restricts flow of the MR fluid through the passage. If the current is high enough, the flow is stopped altogether, thus substantially locking up the MR fluid dampener and resultantly locking up and preventing further acceleration motion. Notably, the current is preferably rapidly switched from a high current value to a low current value (depending upon the sensor inputs) to accomplish real time changes in dampening. As indicated above, though described above in the context of a particular piston design using MR fluids, other piston configurations and/or fluids may be used, including Electrorheological (ER) fluids or Electrophoretic (EP) fluids or hydraulic (e.g., semi-active configurations) fluids for use in respective types of well-known dampener configurations.

Figure 3A:
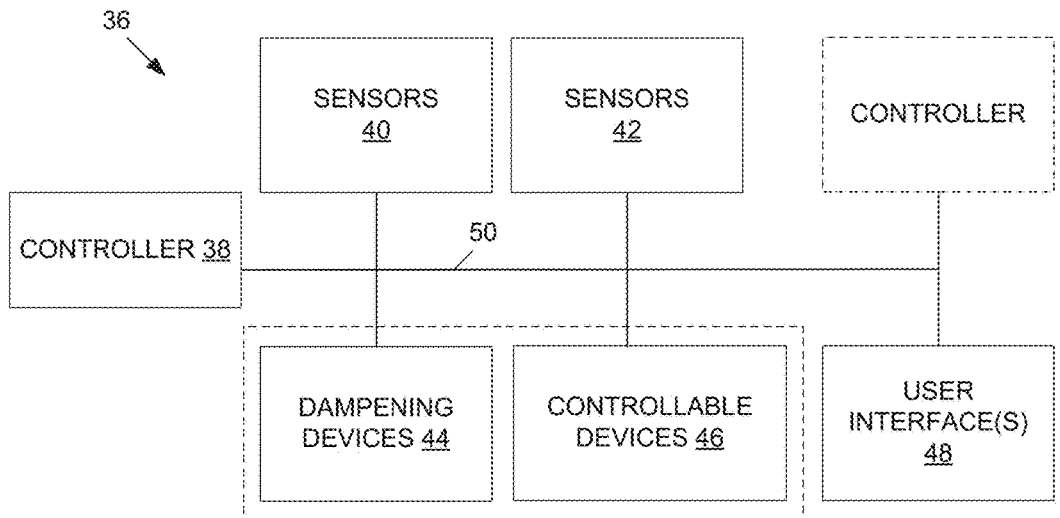
FIG. 3A is a block diagram that illustrates an embodiment of an example control system for a planter adjustable dampening system.

Attention is now directed to FIG. 3A, which illustrates an embodiment of an example control system 36 for a planter adjustable dampening system. One having ordinary skill in the art should appreciate in the context of the present disclosure that the example control system 36 is merely illustrative, and that some embodiments of control systems may comprise fewer or additional components, and/or some of the functionality associated with the various components depicted in FIG. 3A may be combined, or further distributed among additional components, in some embodiments. For instance, in one embodiment, the control system 36 is distributed among the planter 10 (including at one or more of the row units 12) and the towing vehicle. In some embodiments, the control system 36 is hosted entirely by the planter 10. In some embodiments, the control system 36 is distributed among the planter 10 and a remote computing device (e.g., in communication with components of the control system 36 via telemetry or radio frequency communications), and in some embodiments, the control system 36 is distributed among the towing vehicle, the planter 10, and a remote computing device. It should be appreciated by one having ordinary skill in the art that features corresponding to the various embodiments of a control system 36 described herein are interchangeably used with functionality of a planter adjustable dampening system. For purposes of brevity, attention is focused on an embodiment where the control system 36 is distributed among the planter 10 and a towing vehicle, with the understanding that other configurations may be used in some embodiments. The control system 36 comprises one or more controllers, such as controller 38, plural sensors 40, 42, plural dampening devices 44, plural controllable devices 46, and user interfaces 48, all coupled over a network 50, such as a controller area network (CAN), though not limited to a CAN network or a single network. In one embodiment, the network 50 may comprise a wired network (e.g., twisted pair, copper, etc.), a wireless network (e.g., based on IEEE 802.11, Bluetooth, Near Field Communications (NFC), etc.), or a combination of a wired and wireless network. It is noted that there may be plural controllers (an additional one shown in phantom (dashed line) and coupled to the network 50). For instance, the controller 38 may be dedicated to control of the dampening devices 44, and the other controller may be dedicated to control of the controllable devices 46. For purposes of brevity, the following discussion describes the controller 38 as providing control for both the dampening devices 44 and the controllable devices 46, with the understanding that in some embodiments, respective controllers may handle respective down force and dampening functions. The controller 38 is explained further below. In one embodiment, the sensors 40 comprise accelerometers, with each accelerometer coupled to the frame 20 (FIG. 1) of a particular row unit 12 (FIG. 1) and used to measure acceleration of the corresponding (e.g., host) row unit 12. In one embodiment, the sensors 40 comprise position sensors. For instance, for each row unit 12, the position sensor may be positioned internally to the controllable device (e.g., within a cylinder or housing of the controllable device) and/or externally (e.g., measuring the positional change of an extending unit, such as a piston) to the controllable device. In some embodiments, a mix of types of sensors may be deployed. In some embodiments, other types of sensors may be used, such as acoustic, optical, magnetic, etc. The sensors 42 are coupled to the frame 20 of a particular row unit 12, and used to measure the soil resistance for purposes of providing feedback of down force required. For instance, the sensors 42 may comprise a load cell, as is known in the art. In some embodiments, other sensors 42 may be used, such as a global navigation satellite system (GNSS) receiver, which in cooperation with a depth or field map, matches a particular field coordinate (and hence soil hardness) with the required down force. In some embodiments, hardness of the soil may be supplemented or replaced with other parameters, such as bulk density, soil series type, and/or residue levels. In some embodiments, the sensors 40, 42 may comprise all or of any combination of these types of sensors, or a subset of them in some embodiments.

The user interfaces 48 may include an FNR handle, a keyboard/pad and/or mouse, a display device (e.g., tough-type display, liquid crystal diode (LCD), plasma-based, etc.), and/or other input and output devices (e.g., a microphone for audible input, a speaker for audible output, in some embodiments). In other words, the user interfaces 48 may enable an operator to input the level of ride smoothness and/or down force. Based on the input, the controller 38 causes adjustment of the dampening devices 44 and/or the controllable devices 46 to effect the desired dampening or down force, respectively. Adjustments to either the down force or dampening while the planter 10 (FIG. 1) is operating in the field may be communicated to the user interfaces 48 (e.g., display screen, headset, etc.) to inform the operator that such changes have taken place, and in some embodiments, to give the operator an opportunity to reject or accept the impending changes (or acknowledge the changes in some embodiments). The user interfaces 48 may provide feedback of adjustments visually, audibly, and/or via tactile mechanisms. In some embodiments, the user interfaces 48 may afford the operator control of dampening and/or down force. These and/or other mechanisms of operator control and/or feedback of down force and dampening may be used, and hence are contemplated to be within the scope of the disclosure.

In one embodiment, the dampening devices 44 are each embodied as the dampening device of the control and dampening device 32. In one embodiment, the dampening devices 44 comprise MR fluid dampening devices, though other types of dampening devices may be used as set forth previously.

In one embodiment, the controllable devices 46 are each embodied as the controllable device of the control and dampening device 32. In one embodiment, the controllable devices comprise air bags (air springs), though other types of controllable devices may be used as set forth previously. As indicated previously, the controllable devices 46, when embodied as air bags, may be supplied by a source of air from a compressor and controlled using an air valve or other mechanism of control known in the art. It is noted that, although the dampening devices 44 and the controllable devices 46 are depicted separately in FIG. 3A, the separation corresponds to a logical separation (e.g., manner of control), and that in some embodiments, the devices 44, 46 for each row unit 12 may be separately packaged and adjacent to each other and in some embodiments, the devices 44, 46 for each row unit 12 may be provided as a single package (as represented by the dashed box outlining the combination of devices 44, 46).

Figure 3B:
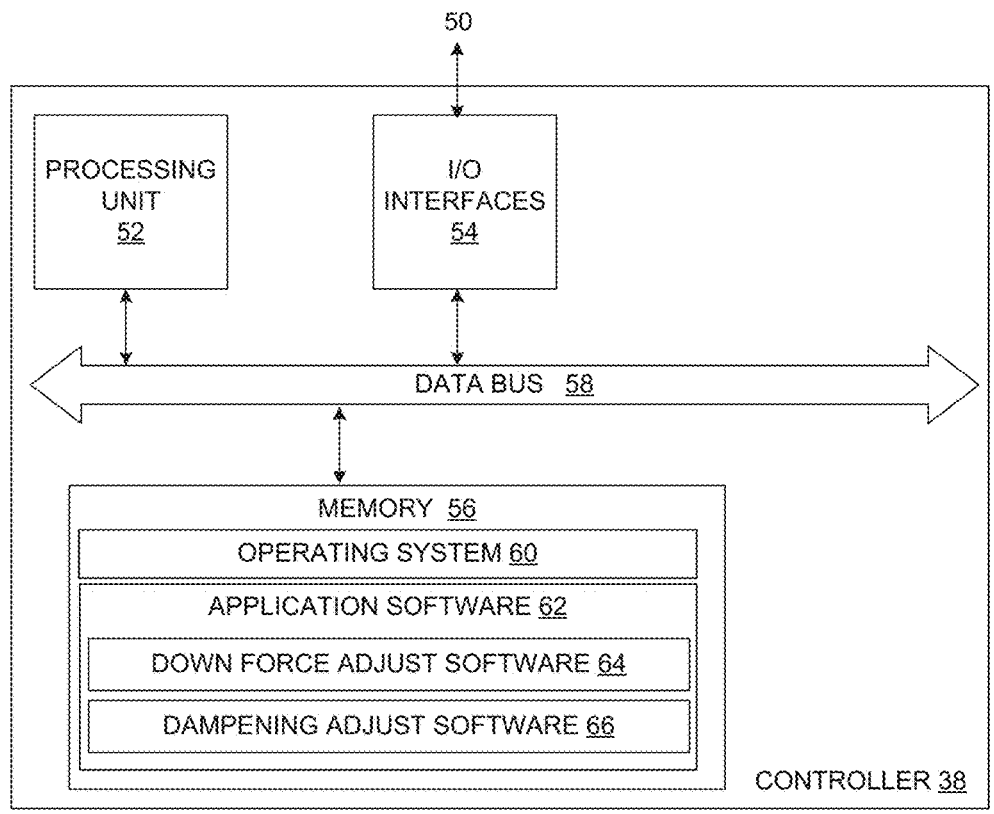
FIG. 3B is a block diagram that illustrates an embodiment of an example controller for the control system of FIG. 3A.

Referring to FIG. 3B, shown is an embodiment of the example controller 38, which comprises a computer architecture. It should be appreciated by one having ordinary skill in the art that the controller 38 depicted in FIG. 3B is one example illustration, and that in some embodiments, fewer, greater, and/or different components may be used. Also, it should be appreciated by one having ordinary skill in the art that certain well-known components of computer systems are omitted here to avoid obfuscating relevant features of the controller 38. In one embodiment, the controller 38 comprises one or more processing units 52, input/output (I/O) interface(s) 54, and memory 56, all coupled to one or more data busses, such as data bus 58. The memory 56 may include any one or a combination of volatile memory elements (e.g., random-access memory RAM, such as DRAM, SRAM, and SDRAM, etc.) and nonvolatile memory elements (e.g., ROM, Flash, solid state, EPROM, EEPROM, hard drive, CDROM, etc.). The memory 56 may store a native operating system, one or more native applications, emulation systems, or emulated applications for any of a variety of operating systems and/or emulated hardware platforms, emulated operating systems, etc. In the embodiment depicted in FIG. 3B, the memory 56 comprises an operating system 60 and application software 62. The application software 62 comprises down force adjust software 64 and dampening adjust software 66. Additional software may be used in some embodiments, including a depth/field map, graphical user interface (GUI) software, browser software, communications software, etc. It should be appreciated that in some embodiments, additional or fewer software modules (e.g., combined functionality) may be employed in the memory 56 or additional memory. In some embodiments, a separate storage device may be coupled to the data bus 58 or coupled via the I/O interfaces 54, such as a persistent memory (e.g., optical, magnetic, and/or semiconductor memory and associated drives).

With continued reference to FIGS. 1-3A, and referring also to FIG. 3B, the down force adjust software 64 computes or determines a down force margin (e.g., for each row unit 12) based on the weight of each row unit 12, the down force (as predetermined according to a default value, manually entered by the operator, and/or as determined by the down force adjust software based on sensor input or historical values for the same field location, such as from a data structure or based on field or depth map data), and the soil resistance (e.g., as entered by the operator, such as via selection from a presented list matching the soil resistance to a soil type for the field to be traversed, via sensor input, and/or via field or depth map data or historical data). In one embodiment, changes in soil hardness may be detected by the sensor 42 and communicated to the down force adjust software 64, which in turn sends a signal to the controllable devices 46 to adjust the down force on the row units 12.

The dampening adjust software 66 receives a signal from sensors 40, which indicates a parameter (e.g., a position of a moving member of the controllable device 46, rate of change in direction and/or acceleration of the row unit 12, etc.). The dampening adjust software 66 compares the value of the parameter to a threshold value that is programmed into, or accessed by, the application software 62. The threshold value may associate the parameter with the commencement or impending commencement of undesirable seed placement (e.g., impending in the sense that there may be a built-in tolerance level that considers reaction time by the control system 36 to jerking or lurching actions of the row unit 12). In other words, if the value of the sensed parameter meets or exceeds the threshold value, seed placement is at risk of being improper or undesirable. In some embodiments, plural thresholds may be used and stored in a data structure, each threshold based on crop conditions, soil conditions, historical data, weather, moisture, etc. If the threshold value is met or exceeded, the application software 62 causes actuation of the dampening devices 44 to adjust the dampening rate to ensure a smooth ride and mitigate the jerky movements that would come about from rough terrain.

Execution of the application software 62, including the down force adjust software 64 and dampening adjust software 66, are implemented by the processing unit 52 under the auspices of the operating system 60. In some embodiments, the operating system 60 may be omitted and a more rudimentary manner of control implemented. The processing unit 52 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 38.

The I/O interfaces 54 provide one or more interfaces to the network 50, as well as interfaces to one or more user interfaces. For instance, the I/O interfaces 50 receive wired or wireless signals from the sensors 40, 42, and provides control signals to the dampening devices 44 and controllable devices 46. The I/O interfaces 54 may also be coupled to one or more user interfaces or other devices to enable control of navigation and/or other machine functions. In some embodiments, the user interfaces 48 may comprise a headset-type display that is coupled to the I/O interfaces 54.

Note that the controller 38 and/or the control system 36 may comprise additional functionality, such as a cellular modem and browser software for accessing devices communicating with a wide area network and/or radio frequency modem for communications with devices located external to the planter 10 and/or the towing vehicle, as well as machine control software for enabling planting control of the planter 10.

When certain embodiments of the controller 38 are implemented at least in part in logic configured as software/firmware, as depicted in FIG. 3B, it should be noted that the logic can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The logic may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 38 are implemented at least in part in logic configured as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
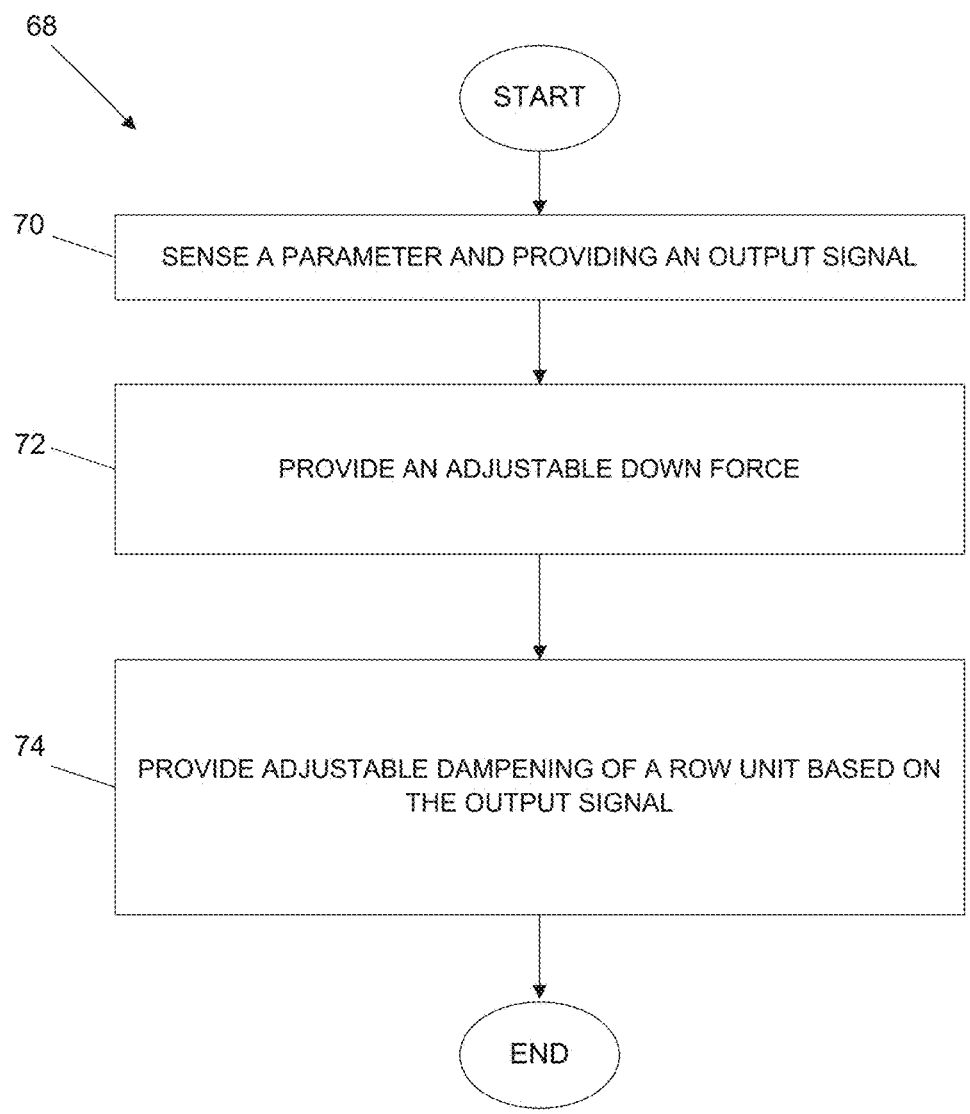
FIG. 4 is a flow diagram that illustrates an embodiment of an example planter adjustable dampening method.

In view of the above description, it should be appreciated that one embodiment of a method for operating a row unit having a frame comprising an upper portion and a lower portion, the upper portion comprising a parallel linkage, the lower portion coupled to plural gauge wheels, denoted in FIG. 4 as method 68, comprises sensing a parameter and providing an output signal (70); providing an adjustable down force (72); and providing adjustable dampening of the row unit based on the output signal (74).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present invention are merely possible examples of implementations, merely set forth for a clear understanding of the principles of the disclosure. Many variations and modifications may be made to the above-described embodiment(s) of the disclosure without departing substantially from the spirit and principles of the disclosure. For instance, although described as using a dampening device per row unit, some embodiments may use a dampening device for plural row units. All such modifications and variations are intended to be included herein within the scope of this disclosure and protected by the following claims.

At least the following is claimed:

1. A row unit, comprising:
   a frame comprising an upper portion and a lower portion, the upper portion comprising a parallel linkage, the lower portion coupled to plural gauge wheels;
   a first sensor configured to provide an output signal, wherein the first sensor comprises an accelerometer;
   a controllable device coupled to the upper portion and configured to provide an adjustable down force; and
   a dampening device coupled to the upper portion and configured to provide adjustable dampening of the row unit based on the output signal.

2. The row unit of claim 1, wherein the dampening device comprises a magnetorheological fluid dampener, an electrorheological fluid dampener, an electrophoretic fluid dampener, or an adjustable hydraulic fluid dampener.

3. The row unit of claim 1, wherein the dampening device is disposed adjacent to and separate from the controllable device.

4. The row unit of claim 1, wherein the dampening device is integrally disposed within the controllable device.

5. The row unit of claim 1, wherein the controllable device comprises an air bag.

6. The row unit of claim 1, further comprising a second sensor, wherein based on a signal from the second sensor, the controllable device adjusts the down force.

7. The row unit of claim 6, wherein the second sensor comprises a load cell.

8. The row unit of claim 1, wherein the dampening device is configured to adjust a dampening rate of the row unit based on the output signal meeting or exceeding a threshold value.

9. The row unit of claim 8, wherein the threshold value comprises a threshold acceleration of the row unit or a threshold change in position of a cylinder of the controllable device.

10. A planter adjustable dampening system, comprising:
    a draw bar;
    a plurality of row units, wherein each of the row units comprises:
        a frame comprising an upper portion and a lower portion, the upper portion comprising a parallel linkage coupled to the draw bar, the lower portion coupled to plural gauge wheels;
        a sensor configured to provide an output signal;
        a controllable device coupled between the draw bar and a lower frame member of the parallel linkage and configured to provide an adjustable down force; and
        a dampening device coupled between the draw bar and the lower frame member of the parallel linkage and configured to provide adjustable dampening based on the output signal; and
    a controller configured to:
        receive the output signal;
        compare the output signal to a threshold value;
        responsive to the output signal meeting or exceeding the threshold value, signal the dampening device to adjust a dampening rate;
        wherein the threshold value is based on an acceleration or a cylinder position of the controllable device where corresponding seed placement from the row unit is undesired.

11. The planter adjustable dampening system of claim 10, further comprising an additional controller and an additional sensor associated with the controllable device, wherein based on output from the additional sensor, the additional controller is configured to signal the controllable device to adjust the down force.

12. The planter adjustable dampening system of claim 10, further comprising an additional sensor, wherein based on output from the additional sensor, the controller is configured to signal the controllable device to adjust the down force.

13. The planter adjustable dampening system of claim 10, wherein the dampening device comprises a magnetorheological fluid dampener, an electrorheological fluid dampener, an electrophoretic fluid dampener, or an adjustable hydraulic fluid dampener.

14. The planter adjustable dampening system of claim 10, wherein the sensor comprises either an accelerometer or a position sensor coupled to the controllable device.

15. The planter adjustable dampening system of claim 10, wherein the controllable device and the dampening device are packaged in a single package.

* * * * *